United States Patent [19]

Shim

[11] Patent Number: 5,066,867

[45] Date of Patent: Nov. 19, 1991

[54] METHOD AND DEVICE FOR GENERATING ELECTRIC POWER BY USE OF WAVE FORCE

[76] Inventor: Hyun J. Shim, 350-39 Sangdo 3-dong, Dongjak-ku, Seoul, Rep. of Korea

[21] Appl. No.: 70,353

[22] Filed: Jul. 6, 1987

[30] Foreign Application Priority Data

Jul. 7, 1986 [KR] Rep. of Korea ............... 5475/1896

[51] Int. Cl.$^5$ .................. F03B 13/10; F03B 13/12
[52] U.S. Cl. .............................. 290/53; 60/495; 417/330
[58] Field of Search .................. 290/53, 42, 54; 417/330, 331–334; 60/495, 507, 504, 398

[56] References Cited

U.S. PATENT DOCUMENTS

| | | | |
|---|---|---|---|
| 4,208,877 | 6/1980 | Evans et al. | 60/495 |
| 4,228,360 | 10/1980 | Navarro | 290/53 X |
| 4,242,593 | 12/1980 | Quilico et al. | 290/53 |
| 4,340,821 | 7/1982 | Slonim | 290/53 |
| 4,355,511 | 10/1982 | Jones | 60/507 |
| 4,560,884 | 12/1985 | Whittecar | 290/53 X |

Primary Examiner—A. D. Pellinen
Assistant Examiner—Sharon D. Logan
Attorney, Agent, or Firm—Fliesler, Dubb, Meyer & Lovejoy

[57] ABSTRACT

The invention relates to a method and device for generating electric power by use of wave force.

According to the invention, it is possiblke to obtain the required power using the floatation bladders rising and falling repeatedly with waves as a power using the floatation bladders rising and falling repeatedly with waves as a power source and the rotation force of gears connected to the floatation bladders through ropes. The invention has advantages in that the construction of the power generating means and its supporting means are simple, execution of work is easy, a kinetic energy is convertable into an electric energy using the floatation bladders regardless of the magnitude of waves, and even in the deep sea, the base frame is not installed on the sea bed, but in a fixed depth under the mean sea level, and thereby the maintenance and repair of device is carried out without any difficulty.

3 Claims, 10 Drawing Sheets

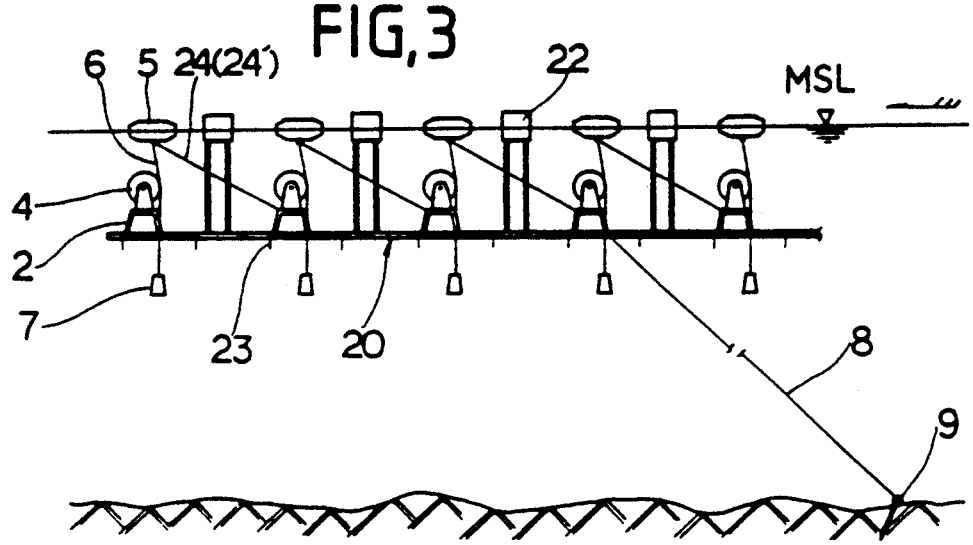
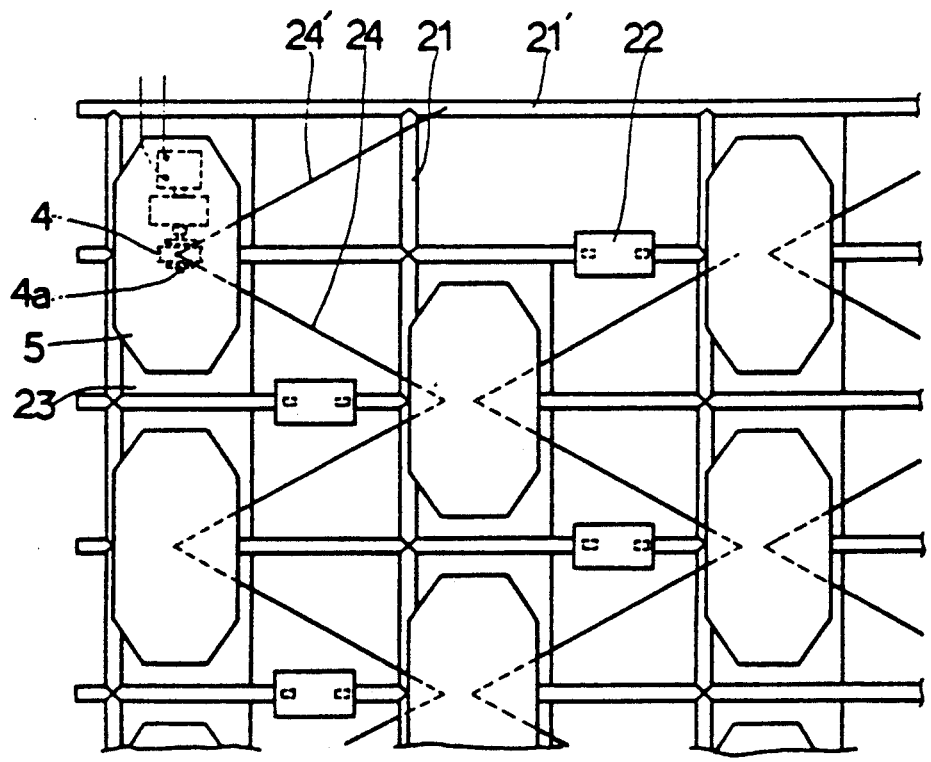

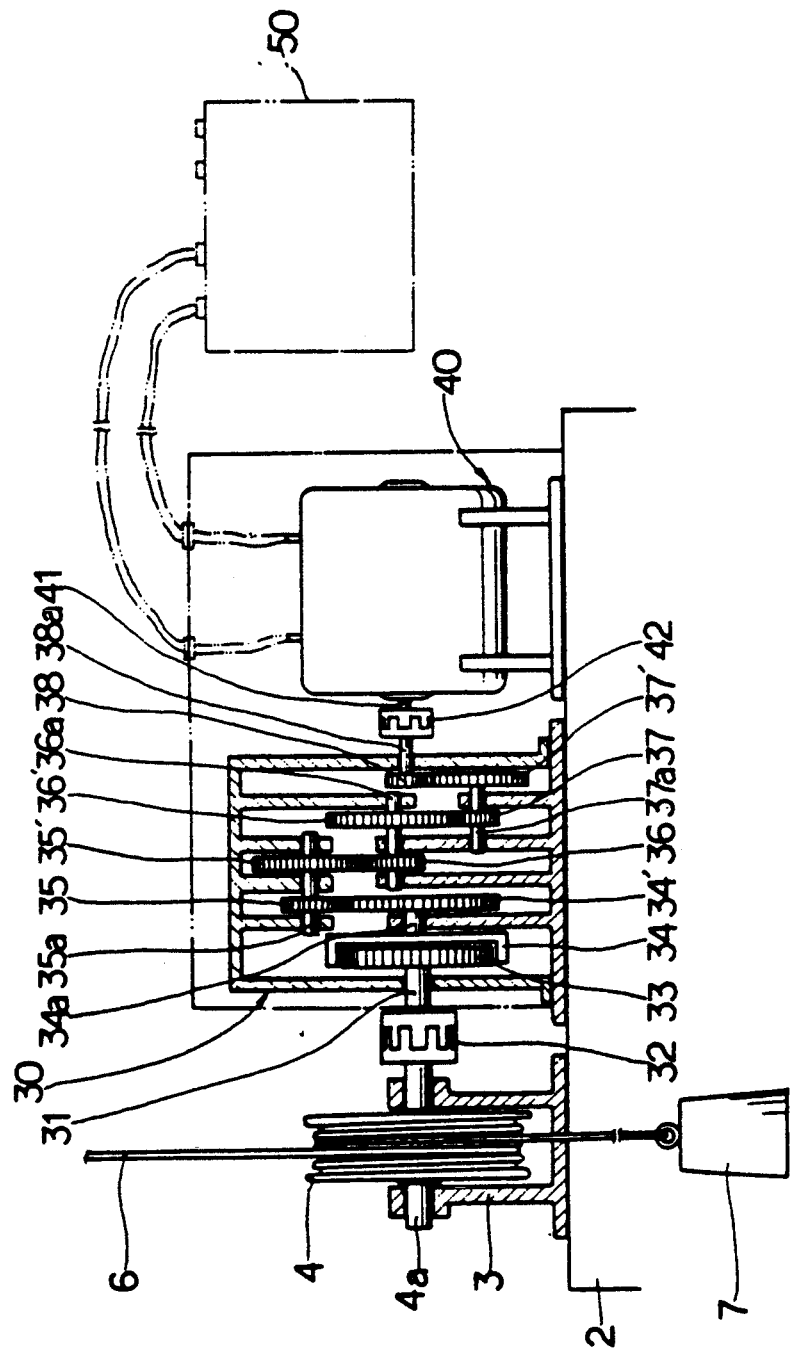

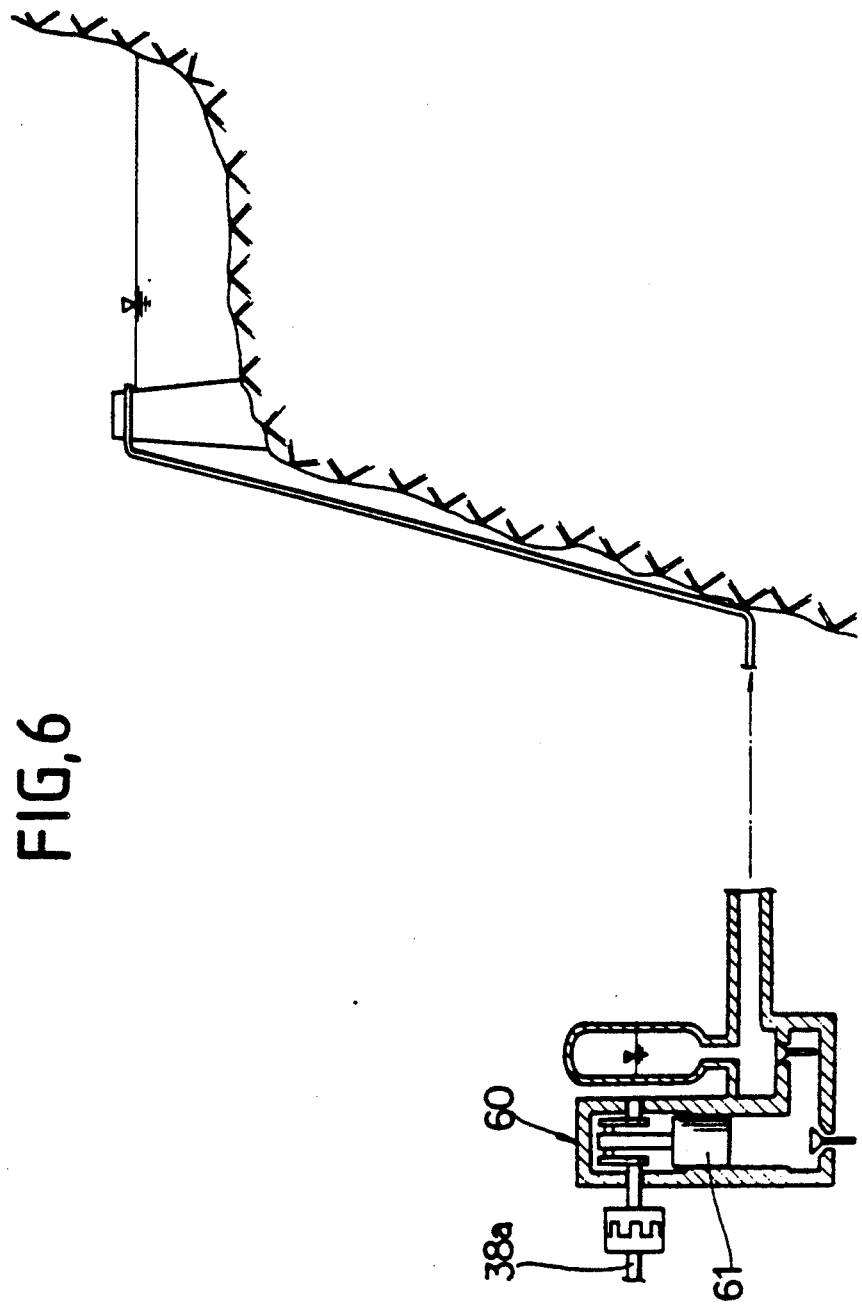

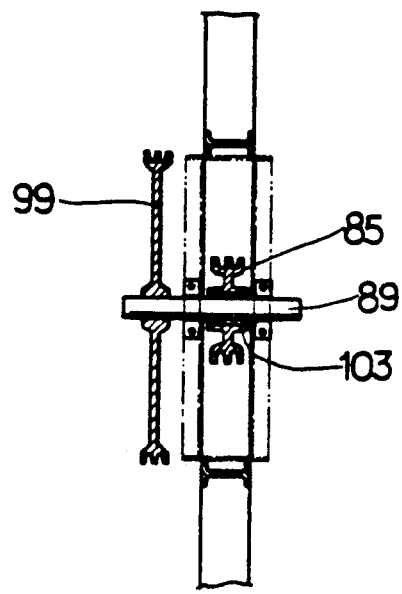
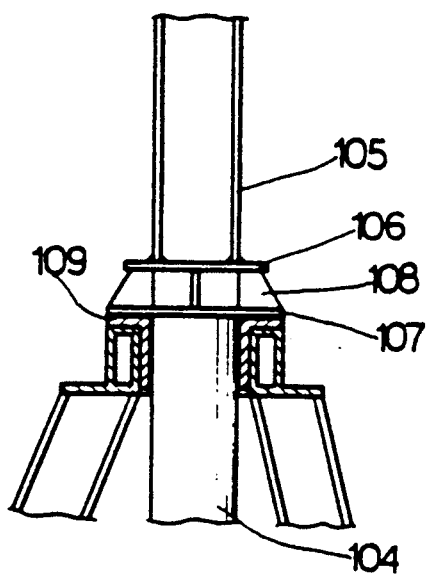
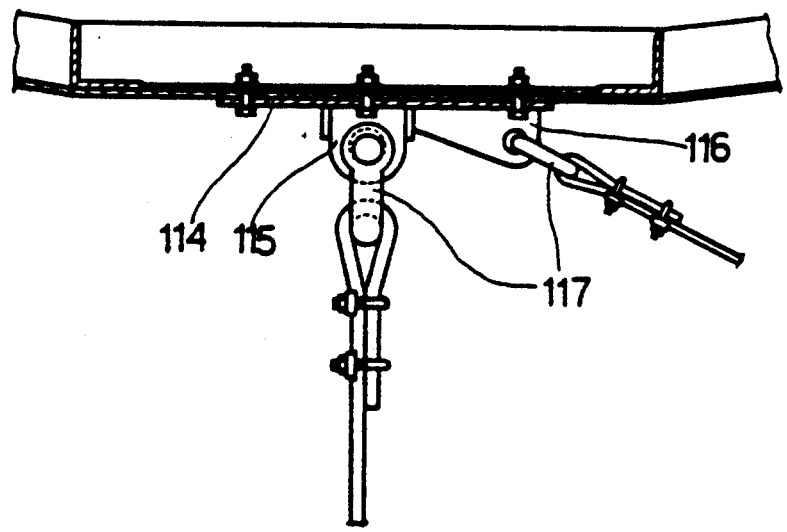

METHOD AND DEVICE FOR GENERATING ELECTRIC POWER BY USE OF WAVE FORCE

FIELD OF THE INVENTION

The present invention relates to a method and device for generating the electric power using the force of waves produced on the surface of the sea, and particularly to a method and device for generating the electric power by the use of wave force, which is designed to generate the electric energy by making the floatation bladders risen on the surface of the water to rise and fall repeatedly using the difference of heights between the ridges and troughs of waves produced continuously, rotating the pulleys set up in a certain depth under the sea level by means of periodic up and down motion of the floatation bladders, and driving the generators by the power changed in speed through transmission gears.

BACKGROUND OF THE INVENTION

It is well known that the sea has always waves caused by a meteorological action, and such waves vary in size because the height, length, cycle, speed, etc. of waves are changed from time to time, but they have usually a course to advance from the offing toward the seashore.

Accordingly, various proposals and attempts are recently made on a device for generating the electric power by catching and using waves produced repeatedly without interruption with the said wave height, wave length and wave-cycle, and converting them into energy.

There are two kinds of conventional oceanic energy conversion modes: one is designed to make the floatation bladders to rise using the difference between the ebb and flow of the tide, to operate the piston pump, etc. by the rising force to suck the sea water up to a certain height, and then to rotate the turbine for production of electric, power using the head of thus sucked sea water; the other is designed to make the floatation bladders rise by their own rising force at high tide, the sea water to be stored in the floatation bladders at low tide, the floatation bladders to fall under the weight of the sea water, a separate fluid pressure means to be operated, and to obtain the power for generating electricity by a fluid ran out of the fluid pressure means.

However, the above-mentioned conventional device for generating electric power has problems in that it is restricted by the place of installation so that it may be installed only near the inshore contiguous to the sea-shore, and that the overall construction of the -device is too complex and incomplete to be put to practical use.

SUMMARY OF THE INVENTION

The principal object of the invention is to provide a method and device for generating electric power by use of wave force, which has not such problems as the conventional method of generating electric power.

It is another object of the invention to provide a method and device for generating electric power, which is designed to apply efficiently not only in the inshore, but also in the deep sea.

It is a further object of the invention to provide a method and device for generating electric power by use of wave force, which is designed to convert efficiently a kinetic energy of waves produced in the inshore and deep sea into an electric energy by means of simple apparatus and easy method of installation.

In one aspect of the invention, the device for generating electric power comprises a supporting means installed in a fixed depth from the sea bottom or mean sea level, a pulley mounted rotatably by the supporting means, a floatation bladder floated on the surface of the sea for rising and falling along the wave-height, a wire rope connected between the floatation bladder and the weight and wound up around the pulley so as to make the pulley rotate according to the up and down movement, and variable transmission gears for converting the rotation force of the said pulley and driving the device for generating electric power or compression pump.

According to the invention composed as described above, it is formed in such structure that the rise and fall of the floatation bladders, which is effected repeatedly along the height of waves produced without cease draws the wire rope and thereby rotates and drives the pulley. Therefore it is possible to simplify the construction of means for generating the power and to make the execution of work simple and easy. Moreover, the rise and fall of the floatation bladders driving the pulley is effected with such short cycle as the moving cycle of waves which are the power sources, the momentum of waves is almost captured for use without failing to catch very small movement of waves, and the pulley is rotated and driven with almost the same magnitude as the momentum of waves. Accordingly it is possible to improve the efficiency of wave utilization.

According to an embodiment of the device for generating electric power by use of wave force, even in a case where many floatation bladders and pulleys are installed in the deep sea, it is of installation structure to be mounted on a frame which is a supporting means rising to a predetermined position under the mean sea level, so that the execution of work is very simple and easy, and it is possible to maintain stably the installing position of the frame at all times independently of the rise and fall of each floatation bladder which is effected continuously.

In another aspect of the invention, the device for generating electric power comprises a rotary column and a generator installed in the fixed depth, from the mean sea level a floatation bladder floated on the surface of the sea for repeating the rise and fall movement, and a chain for transmitting the rise and fall of the floatation bladder to the generator.

According to the invention composed as described above, the floatation bladders rise and fall by waves advancing continuously and repeatedly on the surface of the sea, and the rise and fall movement is transmitted through the rope and chain to a chain pulley connected to the driving shaft gear of transmission and the chain to drive the generator by variable rotation force, so that it is possible not only to reduce the unit cost of electric power by simplifying the construction of power generating means, but also to convert a kinetic energy of waves into an electric energy with the loss of energy minimized by transmitting efficiently the kinetic energy of waves to the generator.

BRIEF DESCRIPTION OF THE DRAWINGS

Embodiments and operational effects of the invention will now be described in more detail, by way of example, with reference to the accompanying drawings. In the drawings, FIG. 3 is a partial side view illustrating further embodiment of the invention, FIG. 4 is a partial plan view of FIG. 3, FIG. 5 is a diagram illustrating the construction of the electric motor and the device for generating electric power according to the invention, FIG. 6 is a diagram illustrating another method of generating electric power according to the invention, FIG. 11 is a sectional view taken along the line A—A in FIG. 8, FIG. 12 is an enlarged view showing the part A of FIG. 8'

FIG. 13 is an elevation view illustrating the connection between the floatation bladder and the rope.

DETAILED DESCRIPTION OF THE INVENTION

Figure 1:
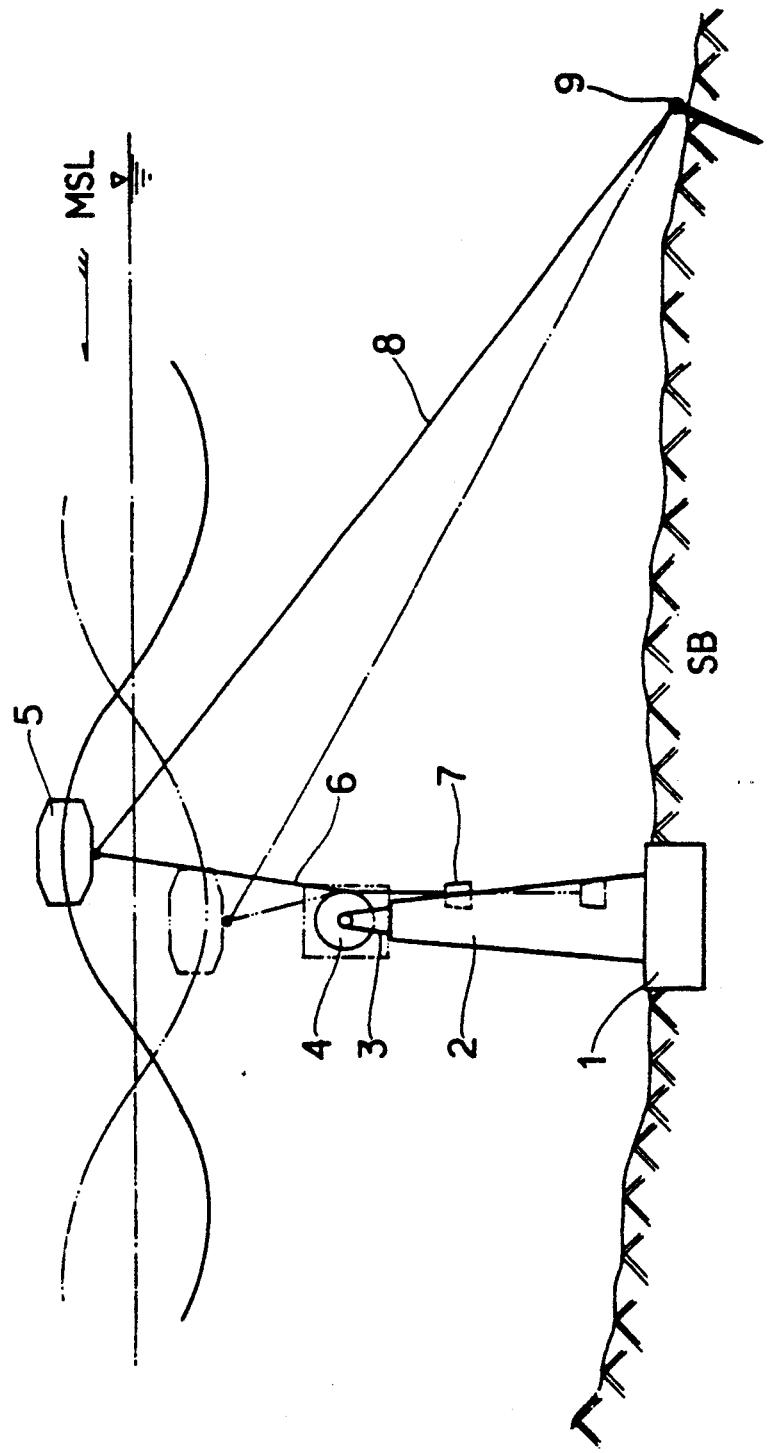
FIG. 1 is a side view illustrating an embodiment of the invention.

As is shown in FIG. 1 which illustrates an embodiment wherein the device for generating electric power by use of wave force according to the method of the invention is installed in the inshore having a depth of about 9-15 m, a concrete base 1 is laid under the sea bed, a supporting framework 2 having a fixed height is installed on the upper side of the concrete base 1, and a support member 3 secured to an upper part of the supporting framework 2 is provided with a pulley 4 which is located in a depth of about 3-4 m under the mean sea level.

Subsequently, a floatation bladder 5 having a required buoyant force (approximately 1-3 tons) is floated on the surface of the sea, and the floatation bladder 5 is connected at the middle of its bottom to an end of a wire rope 6 having a fixed length, and after winding one time round the said pulley 4, the extended end of the wire rope 6 is connected and fixed to a weight 7 (about 200-500 kg).

The bottom of each floatation bladder 5 rising on the surface of the sea is connected to one end of two other anchor ropes 8 (only one is shown in the drawing) and the other end of each anchor rope 8 is connected and fixed to anchors 9 (only one is shown in the drawing) secured in a space to the front side of the supporting framework 2 on which the said pulley 4 is mounted, that is, to both sides of the sea bottom in the main advancing direction of waves as shown by the arrow, so that the floatation bladders 5 rising on the surface of the sea do not move horizontally according to the advancing direction of waves, but operate only in the up and down direction.

When anchors are installed, it is preferable to locate the position of anchors 9 in which each rope 8 is secured, one both sides in a distance equivalent to about 1.2-1.5 times of the depth (9-15 m) from the supporting framework 2 on which the said pulley 4 is mounted, and to maintain the angle between both anchor ropes 8 with the connecting part of floatation bladders 5 as a center in about 30°-40°.

The mounted pulley 4 is designed to rotate counterclockwise and clockwise as the up and down movements of floatation bladders 5 are repeated. According to the invention the power is generated using the rotation force of pulley 4 produced when the floatation bladder 5 obtains an upward bouyant force.

FIG. 5 shows an example of the power transmission process according to the rotation of pulley 4 as described above, in which on the other upper part of the supporting framework 2 on which the said pulley 4 is mounted, are mounted the transmission 30 and the electric generator 40, respectively, and the edge of input shaft 31 passing outward through one side wall of the transmission 30 and the edge of the rotary shaft 4a of pulley 4 are connected by a motor-operated clutch 32.

At the end of input shaft 31 located in the interior of the transmission 30 is mounted an input gear 33, which is engaged with a one-way gear 34 designed to rotate only when the said pulley 4 and the input gear 33 rotate by the rising force of the floatation bladder 5, and at the other end of the shaft 34a on which the one-way gear 34 is mounted, the first interlocking gear 34' is mounted. On the other hand, the other side wall of the transmission 30 is provided with an output shaft 38a, and the second, third and fourth interlocking gears 35, 35'; 36, 36'; 37, 37' for changing the rotation force and speed of the said pulley 4 so as to become such one as required for driving of the electric generator 40 are mounted one after another between the output gear 38 secured to the interior end of the output shaft 38a and the said first interlocking gear 34'. Furthermore, the exterior end of the output shaft 38a of the said transmission 30 is connected to the end of the driving shaft 41 of the electric generator 40 through the motor-operated clutch 42 so that the electric generator 40 is driven directly by the rotation force increased through the said transmission 30 to generate electric power.

However, according to the said device for generating electric power, or in other words, according to a device generating electric power which is, according to the invention, designed to generate the power using the rotation force of the pulley 4 produced by the upward bouyant force of the floatation bladders 5, and to be transmitted the power through the one-way gear 34 of the transmission 30, the driving force necessary for generating the electric power is transmitted not continuously but intermittently, and accordingly the electric power produced by the electric generator 40 is also output intermittently. Therefore, the electric power is first stored in a storage battery 50, and in a case of need, it is possible to use the electric power charged in the storage battery 50.

The aforementioned embodiment is to output in increased speed the power generated according to the invention through the output shaft 38a of transmission 30, to drive thereby directly the electric generator 40, and to generate the electricity. However, the invention may be applied to any ordinary mode for generating electric power in which as illustrated in FIG. 6, a piston pump 60 is driven by the power transmitted to the output shaft 38a of transmission, and the sea water is pressed out to and stored in a dam or reservoir constructed at the seashore by means of the sucking and compressing action of the piston 61 so as to use the head of stored sea water. Moreover, the invention is not limited to the above-described embodiments, but it is possible to adopt other modes of generating electric power as applied according to the principles of the invention.

Figure 2:
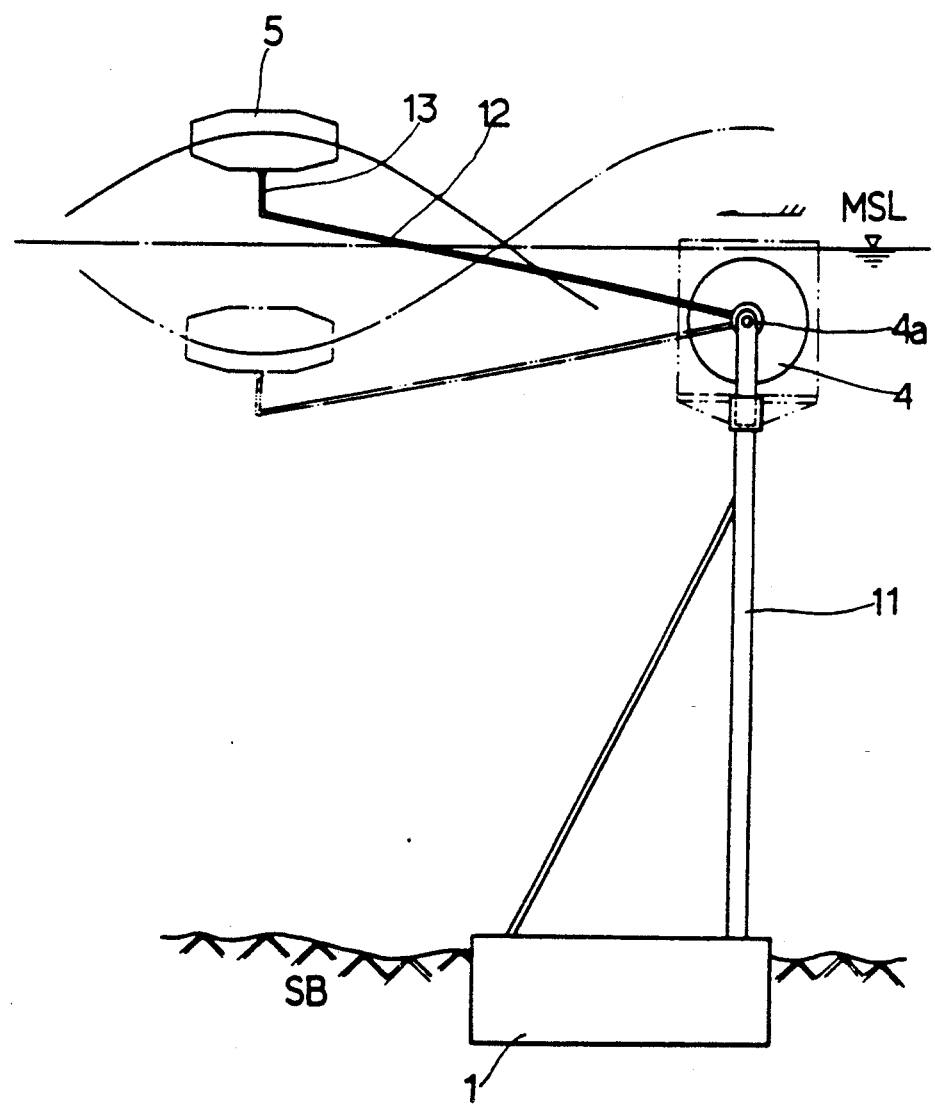
FIG. 2 is a side view illustrating another embodiment of the invention.

FIG. 2 shows another embodiment in which the device for generating electric power according to the invention is installed in the vicinity of the inshore as described above. According to the embodiment, a supporting pole 11 is erected vertically on the concrete base 1 laid under the sea bed of the sea bottom, and on the top of the pole 11 is mounted a pulley 4 as described above, and the pulley 4 is located in depth of about 1 m under the mean sea level so as to rotate freely in any direction from the pole 11 as a center.

One end of an operation lever 12 having a fixed length (about 5 m) is secured to the rotary shaft 4a in which the pulley 4 is fitted as described above, and the other end is connected to the floatation bladder 5 rising on the surface of the sea by a wire rope 13 having short length (about 1 m).

The support of rotary shaft 4a is rotatably coupled to pole 11, illustrated in FIG. 2 by inserting the support into the cavity of the pole frame. Accordingly the floatation bladder 5 can rotate round the pole 11 with a fixed radius having the pole 11 as a center in the advancing direction of waves and to be repeated only the rise and fall in the upward and downward direction along the height of waves in a state located in the opposite direction of the advancing side of waves. The operation lever 12 connected to the rotary shaft 4a of the pulley 4 is travelled upward and downward with the rotary shaft 4a as a center, and the pulley 4 is also rotated clockwise and counterclockwise, and it is thereby possible to obtain the power to drive the transmission 30 and the electric generator 40 or the piston pump 6, as described above.

FIG. 3 and FIG. 4 show further embodiments in which the device for generating electric power according to the invention is installed in the deep sea having depth of about 150–120 m.

The reference number 20 in the drawings represents a frame installed in a fixed depth (about 9–10 m) under the mean sea level for mounting the floatation bladder 5 and pulley 4 as described above. The frame 20 comprises a plurality of hollow support pipes 21, 21' of a predetermined dimension which are arranged in a form of lattice with a certain space on the same plane. On the frame 20 are mounted a plurality of floatation bladders 5 and pulleys 4 having such construction as described in the first embodiment by means of respective supporting framework 2.

The frame 20 is located always in a proper position under the surface of the sea, in other words, in the depth of about 9–10 m under the mean sea level by the buoyant force of the hollow formed interior of each supporting pipe 21, 21' connected longitudinally and latitudinally to each other and the air bladder 22 mounted in a fixed position on the supporting pipes 21, 21' and rising on the surface of the sea.

It is practicable by making the entire load applied to the frame 20 to be equal to the total buoyant force acting by the sum of the self-buoyant force of the hollows of each supporting pipes 21, 21' and the buoyant force of the air bladders 22.

In the plane space between supporting pipes 21, 21' arranged with a certain space as described above, is mounted at one side a rectangular load box 23 of a fixed dimension open to the bottom so that the frame 20 is prevented from floating upward and downward as a whole due to a force acting at the time when each floatation bladder 5 on the top of the wire rope 6 wound around the pulley 4 located in the upper part rises following the waveheight.

On the other hand, a frame 20 is mounted in such way that the frame 20 and the anchor 9 secured to the sea bed of sea bottom are connected each other by an anchor rope 8 or chain so that the frame 20 is prevented from a horizontal travelling beyond a certain distance by the force of waves, and is movable along the advancing direction of waves in the limit of the radius of the anchor rope 8.

Since each floatation bladder 5 connected to the said pulley 4 via the wire rope 6 is connected by other wire ropes 24, 24' one end of which is fixed to the supporting framework 2, a rising and falling movement of the floatation bladder 5 according to the difference of waveheights can be obtained without a horizontal travelling beyond a certain distance in the advancing direction of waves, and on the rotary shaft 4a of each pulley 4 are mounted the transmission 30 and electric generator 40, respectively, so as to generate the required electric power.

The device of the invention with such construction as described in the above-mentioned embodiments, must be installed in such way that a plurality of floatation bladders 5, pulleys 4 and load boxes 23 are mounted on the frame 20, and the frame 20 is mounted so as to maintain always, a state parallel to the mean sea level in the fixed depth under the mean sea level by means of the selfbuoyant force of each supporting pipes 21, 21' and air bladder 22, and thus mounted frame 20 is not allowed to rise together with each floatation bladder 5 when this is rising. To this end, the frame 20 of the device according to the invention is provided with a rectangular load box 23 open to the bottom as described above so as to have a controlling force corresponding to the rising force of each floatation bladder 5. A detailed example thereof will now be described.

In a case where a frame 20 is made by 32 m × 64 m in size and 2048 m² (4 m × 8 m) in the total surface area, it is possible to install about sixty floatation bladders 5 on a frame 20.

Considering that the buoyant force B of one floatation bladder 5 is about two tons, and the time in which the rising force acts on each floatation bladder 5 is 3–7 seconds, it is required that the frame 20 is not moved upwards within such time.

Accordingly when the load box 23 installed under the bottom of each floatation bladder 5 is made by 4 m in width, 4 m in length and 1 m in height, and its specific weight is 1 ton, the full load G of the load box 23 amounts to 16 tons (4×4×1×1), that is, B:2 tons > G:16 tons Wherein the upward buoyant force B acting through each floatation bladder 5 is 2 tons, while the full load of each load box 23 is 16 tons so that the frame 20 is not travelled by the rising action of each floatation bladder 5, but maintained stably at the horizontal degree in a certain depth under the mean sea level. Moreover, since each floatation bladder 5 is not operated at the same time depending on the difference of deformation cycles of waves, the installing condition of the frame 20 is to be maintained at all times parallel to the mean sea level regardless of the rise and fall of the floatation bladder 5.

Figure 7:
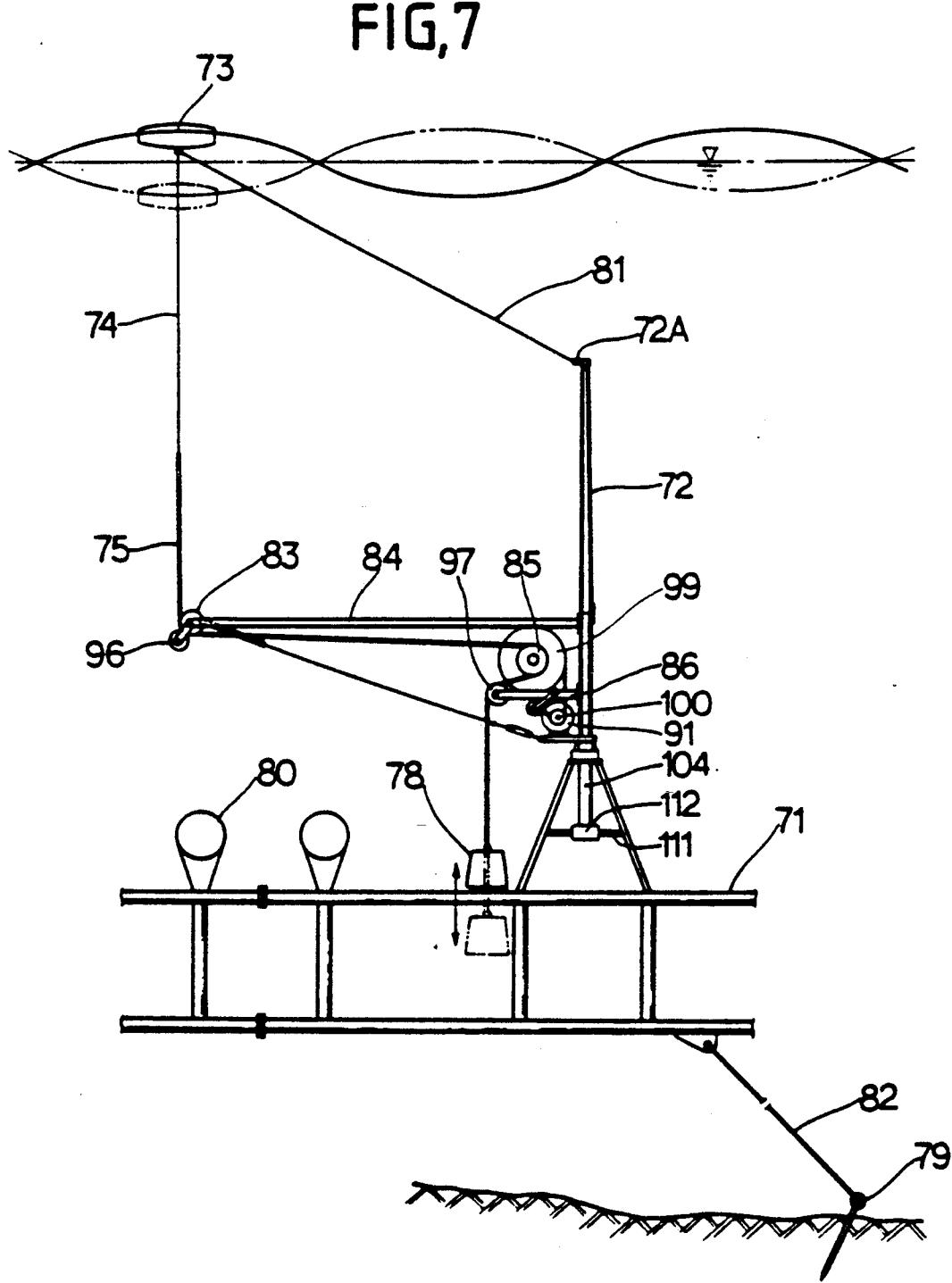
FIG. 7 is a partial elevation view illustrating another embodiment of the invention.
Figure 8:
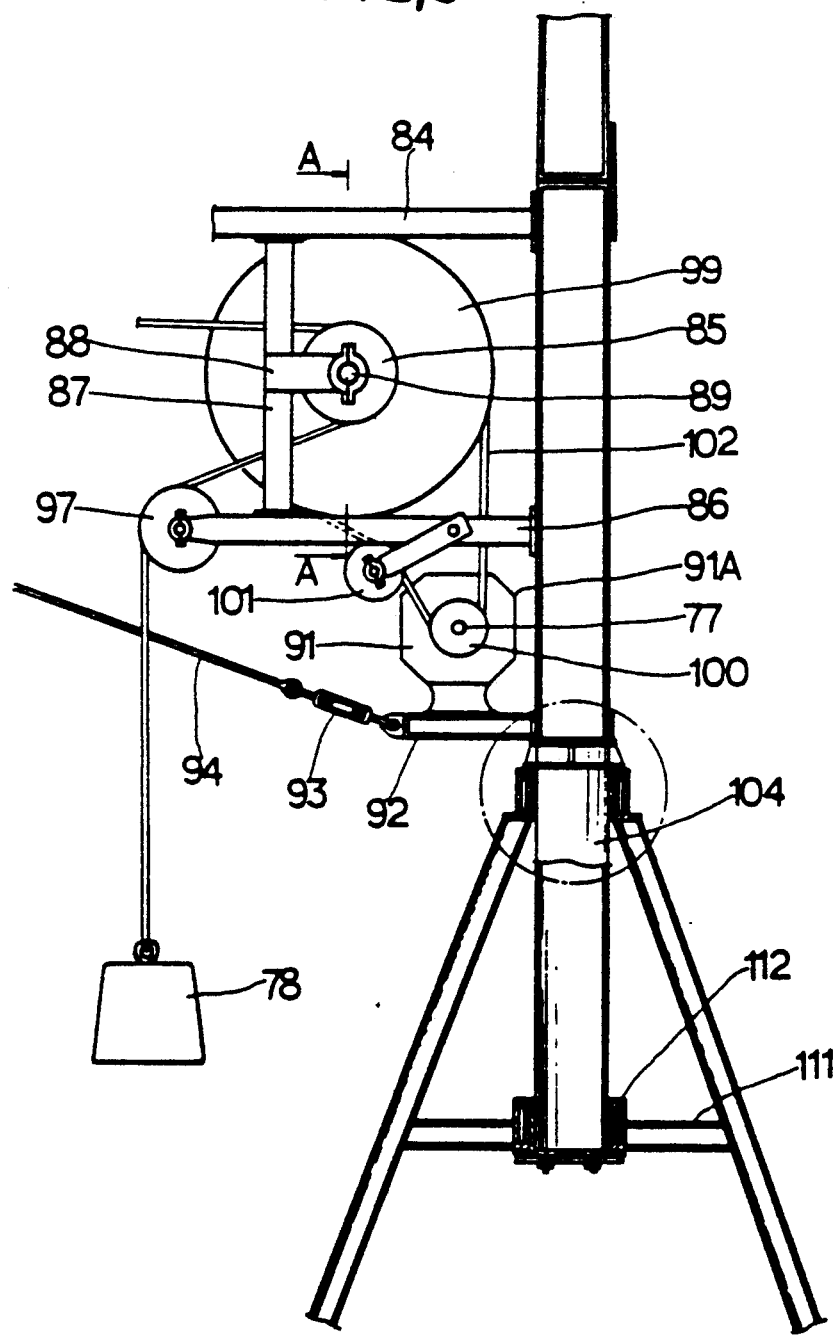
FIG. 8 is a partial enlarged view of FIG. 7.

As is shown in FIG. 7, which is a partial elevation view showing a state that a device for generating electric power by use of wave force according to another embodiment of the invention is installed in the sea, and in FIG. 8, which is a partial enlarged-scale view of FIG. 7, the four corners of the lattice-formed frame 71 installed in a fixed depth (about 10 m) in the sea are connected to and supported by the anchor 79 fixed on the sea bed through a rope 82, and four air pockets 80 per compartment are mounted on the lattice-formed frame 71 of the rotary column 72 in such manner that the buoyant force acting to the air pockets 80 comes to 1.2 times of the total underwater weight represented by a compartment, and the whole device is not swayed or shaken by a little ocean current of the sea bed without appling an excessive force to the rope 82 connected to the said anchor 79.

The rotary column 72 is supported and fixed rotatably at its lower part by four I-form beams secured to the frame 71. The upper part of the rotary column 72 is formed of H-form beam, while the lower part is formed of a cylindrical tube. The top 72A of the rotary column 72 is connected to the floatation bladder 73 located on the surface of the sea by the rope 81, and in the middle of the rotary column 72, an upper arm 84 provided with the pulley 83 and 96 at the top is mounted perpendicular to the rotary column 72. Referring to FIG. 8 under the said upper arm 84 a lower arm 86 is mounted perpendicular to the rotary column 72, and between the upper and lower arms 84, 86 a reinforcing member 87 is mounted in connection with them, and in the middle of the reinforcing member 87 a supporting member 88 is mounted perpendicular to the reinforcing member 87.

On the front edge of the supporting member 88 is mounted a rotary shaft 89 of the first sprocket 85 in which the oneway clutch (bearing 103 FIG. 11) is interposed, and at the extension of the rotary shaft 89 is mounted the second sprocket 99 which is connected to the third sprocket 100 mounted on the input shaft 77 of the transmission through the chain 102. The chain 102 wound between the second and third sprockets 99, 100 is constructed in such a way that the tension is regulated by the tension sprocket 101 mounted movably on the lower arm 86.

The stand 92 of the transmission and the electric generator 91 located under the lower arm 86 and mounted perpendicular to the rotary column 72 is connected at its front edge to one end of the upper arm 84 via the turnbuckle 93 and the tie rod 94.

Referring back to FIG. 7, the rope 74 connected to the bottom of the floatation bladder 73 located on the surface of the sea and extended in vertical direction is connected to the chain 75 above the pulley 83, and the chain 75 passes between the pulleys 83, 96 and winds round the first sprocket 85 and then connected to the plumb 78 having a predetermined weight (about 300 kg) through the pulley 97 mounted at the front edge of the lower arm 86.

According to such construction, when the floatation bladder 73 is in the rise and fall motion, the rise and fall is transmitted to the first sprocket 85 via the rope 74 and chain 75 and rotates the first sprocket 85 clockwise and counterclockwise, but the second sprocket 99 rotates only when an upward buoyant force acts on the floatation bladder 73, by means of the one-way clutch bearing 103 inserted in the first sprocket 99 In other words, the second sprocket 99 rotates intermittently in one way, and accordingly the third sprocket 100 mounted on the input shaft 77 of the transmission and the electric generator 91 rotate also intermittently to drive the electric generator intermittently.

FIG. 12 is a detailed view illustrating the connecting condition between H-form beam 105 forming the upper part of the rotary column 72 and the lower cylindrical tube 104, in which the upper flange 106 and lower flange 107 of the top of the cylindrical tube 104 are connected to each other by four ribs 108 formed around the cylindrical tube 104, and on the surface of the upper flange 106 is welded the lower end of H-form beam 105. The bottom of the lower flange 107 and the upper part of the cylindrical tube 104 are contacted with and supported by rotatably the upper surface and inner surface of a packing 109 such as teflon, respectively, and at the same time the peripheral surface of such packing 109 is enclosed by a cylindrical hollow steel pipe 110. The lower end of the rotary column 72 is inserted and secured rotatably in a cylindrical (FIG. 8) formed on the supporting member 111 (FIG. 8) welded in the middle of four I-form beams supporting the rotary column 72. On the periphery of the part in which the cylindrical tube 104 is inserted, in other words, on the inside of the fixture 112 is formed a packing so as to make a smooth rotation of the rotary column 72.

As is shown in FIG. 11 the second sprocket 99 is mounted on the rotary shaft 89 of the first sprocket 85 in which the one-way clutch bearing 103 is interposed. Consequently, even when the first sprocket 85 rotates clockwise and counterclockwise by the rise and fall of the floatation bladder 73, only the rotation force produced at the moment the upward buoyant force acts on the floatation bladder 73, is transmitted to the second sprocket 99. In other words, when the floatation bladder 73 falls, the first sprocket 85 is out of gear and accordingly the second sprocket 99 is not rotated.

Figure 9:
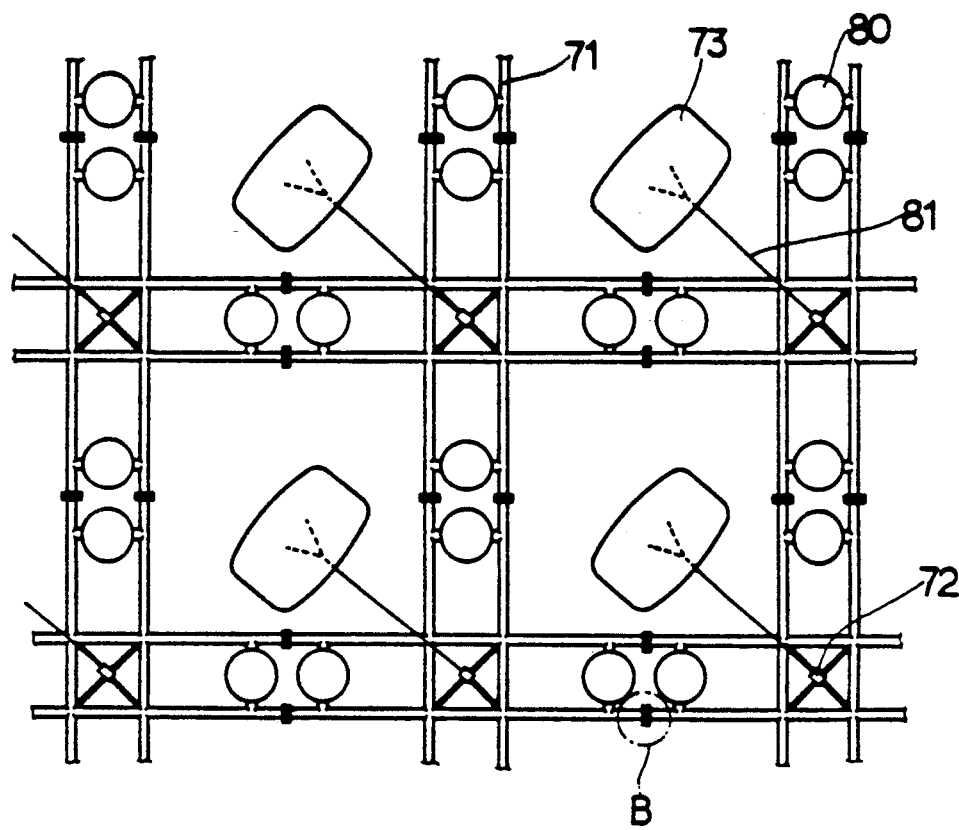
FIG. 9 is a plan view illustrating a combination of many devices of FIG. 7.
Figure 10:
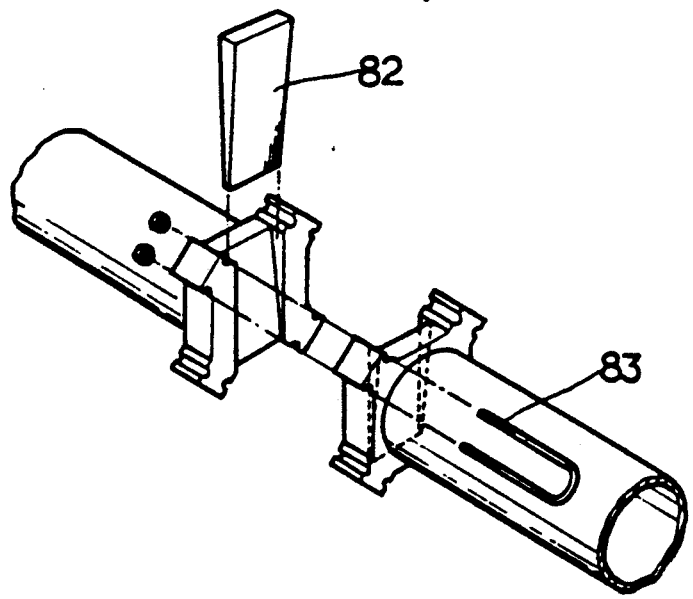
FIG. 10 is a disassembled perspective view showing the part B of FIG. 9.

As is shown in FIG. 9, which is a partial plan view of the device for generating electric power by use of wave force according to the present embodiment, each frame 71 having one floatation bladder 73 forms as a whole a lattice-form arrangement connected to adjacent frames in all directions on the same plane. In other words, in a fixed position on the frame 71 extended in all directions with the rotary column 72 on the frame 71 as a center is mounted an air pocket 80, so as to provide the frame 71 with the upward buoyant force, and each front edge of the frame 71 is couple with the adjacent frame by a wedge 82 and U-form bolt 83 as shown in FIG. 10.

Figure 14:
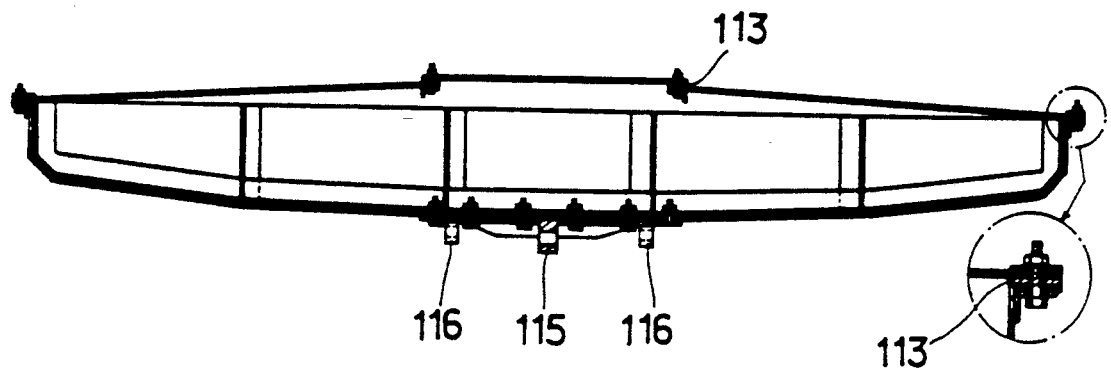
FIG. 14 is a longitudinal sectional view of the floatation bladder.
Figure 15:
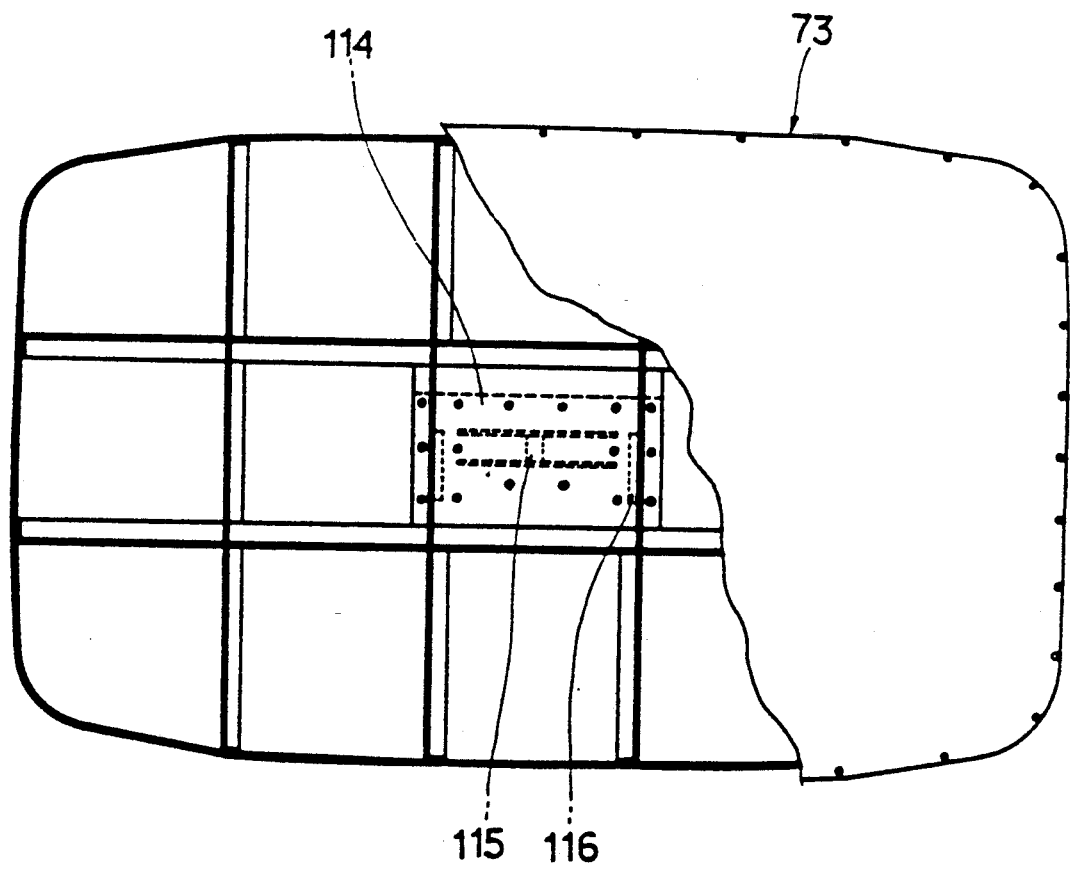
FIG. 15 is a plan view of partial cut-off floatation bladder.

As is shown in FIG. 14, which is a longitudinal sectional view of the floatation bladder 73, and in FIG. 15, which is a partially cutout plan view of the floatation bladder 73, is coupled by bolt with a packing interposed so that the inner part of the floatation bladder is sea-led completely to prevent the sea water from infiltrating into it.

As is shown in FIG. 13 and FIG. 15, in the middle of the bottom of floatation bladder 73 is attached by bolts a rectangular plate 114 for connecting the ropes, and in the middle of the plate 114 are formed on both sides the first coupling member 115 for coupling with the rope 74 connected to the chain 75 and two second coupling members 116 for coupling with the rope 81 connected to the front edge 72A of the rotary column 72. The first coupling member 115 and the second coupling members 116 are connected to ropes 74 and 81 through shackles 117, and the rope 81 connected to the front edge 72A of the rotary column 72 is divided into two ropes at the lower part of the floatation bladder 73 and each rope is connected to the second coupling members 116, respectively. Accordingly, the floatation bladder 73 on the surface of the sea remains at all times in the line of apsides perpendicular to the direction of the wind by means of the rope 74 extended downward vertically from the first coupling member 115 on the bottom and the rope 81 connected to the front edge 72A of the rotary column 72 from the second coupling member 116.

In other words, all floatation bladders 73 located on the surface of the sea are arranged in the line of apsides perpendicular to the advancing direction of waves.

As described above, the power is transmitted to the transmission and the electric generator 91 only when the upward buoyant force acts on the floatation bladder 73, and accordingly the electricity produced out of the electric generator is also output intermittently. Therefore the electricity is stored first in the storage battery and when needed, it is possible to use the electricity charged, in the storage battery. At this moment the casing 91A in which the transmission and the electric generator 91 are contained, is sealed completely and filled; with the compressed air so as to maintain in the interior of the casing 91A the pressure equivalent to 1.2 times of the hydraulic pressure applied to the water depth, and the sea water is thereby prevented from infiltrating the casing 91A of the said transmission and the electric generator 91.

According to this embodiment, it is designed to output the power produced according to the invention with the speed increased through the transmission, and thereby to drive directly the electric generator to generate the electricity, but in embodying the invention, it is also possible to drive the piston pump or air compressor with the power transmitted to the output side of the transmission and thereby to convert it into a power utilizable actually for the human life.

As described above, this embodiment is designed to obtain the required power using the floatation bladder 73 rising and falling repeatedly without interruption with waves as power source and the rotation force of gears connected to the floatation bladder 73 through the rope 74. Therefore it is possible to simplify the construction of the means for generating power and the supporting means thereof and to make the execution of work simple and easy. Moreover, since the floatation bladder 73 is almost restrained from moving transversely by two ropes without regard to the magnitude of waves, and the line of apsides of the floatation bladder 73 is always perpendicular to the advancing direction of waves, it is possible to convert efficiently the kinetic energy of waves into an electric energy.

Particularly, even in a case where the device of the above-described embodiment is installed in the deep sea, the base frame supporting it is not installed on the sea bottom, but in a fixed depth under the surface of the sea, and in such a state, it is possible to maintain stably at all times the location of installation and thereby to provide advantages that the maintenance and repair as well as the work of installation are easy.

Obviously many modifications and variations of the present invention are possible in the light of the above teachings. It is therefore to be understood that within the scope of the appended claims in the invention may be practices otherwise than as specifically described.

What is claimed is:

1. A device for generating electric power from waves on a surface of a body of water, comprising:
   a lattice-shaped frame;
   a rotary column mounted on said frame;
   a floatation bladder floating up-and-down on the water surface in response to rise and fall motion of the waves;
   means for transmitting the up-and-down motion of the floatation bladder to a transducer, including a chain coupled to said floatation bladder and a plurality of sprockets being coupled to said rotary column and rotating in gear with the chain; and
   means for maintaining said frame at a predetermined depth under mean water level.

2. A device as in claim 1, wherein said rotary column is installed rotatably in the advancing direction of the waves, wherein the rotary column and the floatation bladder are connected to each other through a rope so as to maintain the floatation bladder at a distance measured perpendicular to the advancing direction of waves.

3. A device as in claim 1, wherein said means for maintaining said frame at a predetermined depth comprises a plurality of air pockets for providing a buoyant force of substantially 1.2 times the total underwater weight of said device.

* * * * *